J. R. BOWERS.
COTTON KNIFE AND HOOK.
APPLICATION FILED OCT. 8, 1912.
1,060,811.
Patented May 6, 1913.
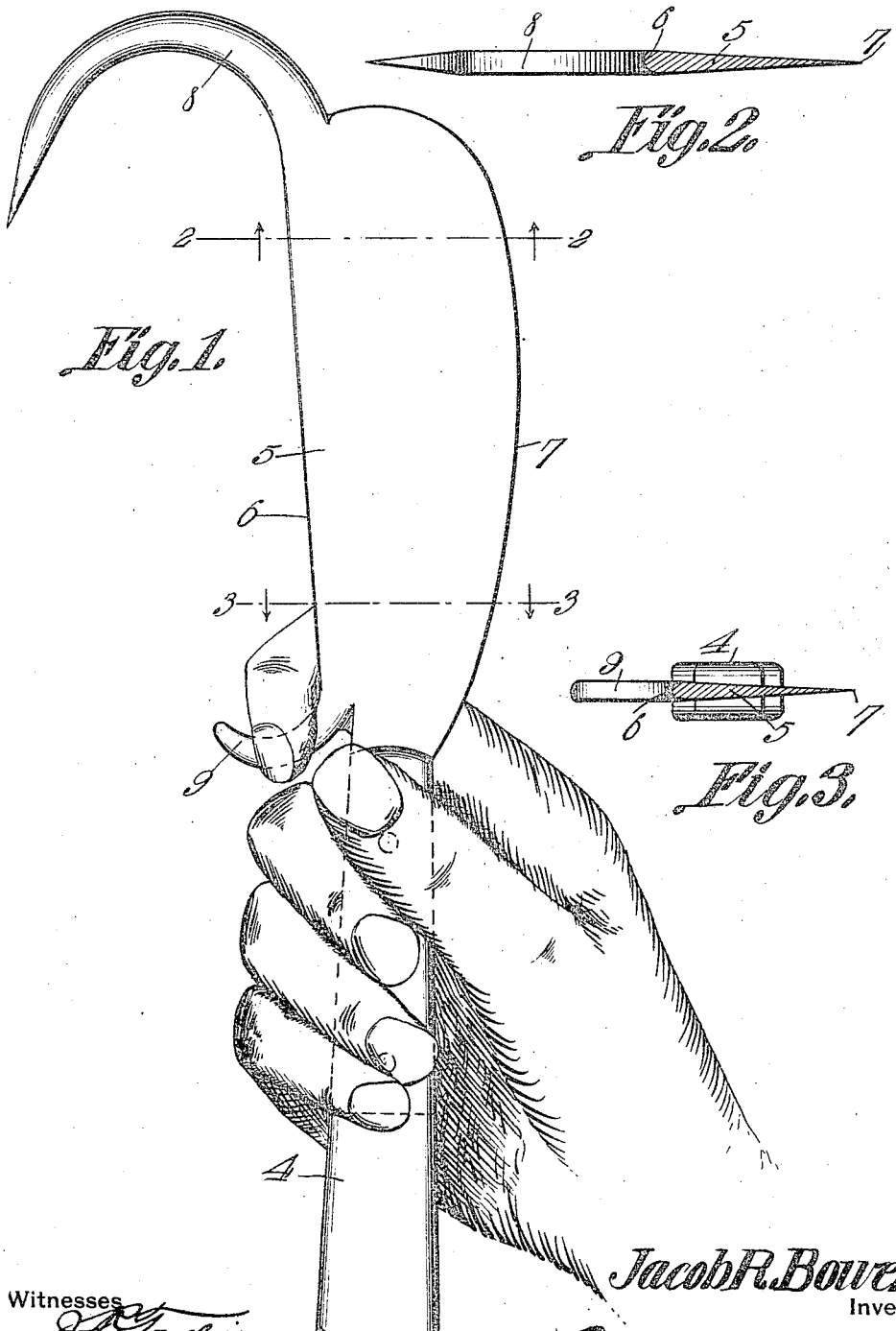

UNITED STATES PATENT OFFICE.

JACOB R. BOWERS, OF WAELDER, TEXAS.

COTTON KNIFE AND HOOK.

1,060,811.  Specification of Letters Patent. Patented May 6, 1913.

Application filed October 8, 1912. Serial No. 724,665.

*To all whom it may concern:*

Be it known that I, JACOB R. BOWERS, a citizen of the United States, residing at Waelder, in the county of Gonzales and State of Texas, have invented a new and useful Cotton Knife and Hook, of which the following is a specification.

The present invention appertains to a combined knife and hook, adapted particularly for use in sampling bales of cotton.

It is the object of the present invention to provide a knife including a handle and a blade, the blade having a hook combined therewith in order that the blade may be employed for cutting or opening the bagging and so that the hook may be employed for withdrawing or extracting the sample of cotton.

Another object of the invention is to provide such a knife, wherein the blade is provided with a finger hold at its inner end or hilt portion, so that the hand of the operator which grasps the handle may have its forefinger engaged over the finger hold in order to provide a secure grip when the hook is employed.

With the foregoing and other objects in view, the present invention resides essentially in the knife embodying a handle and a blade having one edge sharpened and the other edge thickened, the outer end of the thickened edge of the blade merging into a hook, and the inner end of the thickened edge merging into a finger hold.

The invention has been illustrated in its preferred embodiment in the accompanying drawing, wherein:—

Figure 1 is an elevation of the knife. Figs. 2 and 3 are sectional views taken on the lines 2—2 and 3—3 of Fig. 1 respectively.

Referring specifically to the drawings, the handle has been designated by the numeral 4, which has the blade 5 attached thereto, such as by providing the blade with a flat tang at its inner end projecting into and being secured within the handle. One edge of the blade is thickened and offset outwardly from the respective edge of the tang as designated by the numeral 6 and the other edge 7 of the blade is sharpened, the outer end of the thickened edge of the blade merging into a hook 8 and the shoulder provided at the inner end of the thickened edge merging into an outwardly curved projection forming a finger hold 9. The hook 8 and finger hold 9 lie in the plane of the blade 5, and project away from the blade. The sharpened edge 7 is curved from the handle to the butt end of the hook 8. The handle 4 is preferably constructed of wood or similar material, and the blade is forged or otherwise fashioned from suitable metal, and tempered. It will thus follow, that the knife may be employed for sampling bales of cotton by opening the bale by means of the sharpened edge 7, and by reversing the knife, the hook 8 may be brought into play for extracting the sample. When the hook 8 is brought into operation, the forefinger of the hand grasping the handle may be engaged over the finger hold 9 so as to secure a firm grip on the knife. The finger hold in connection with the hook provides a highly desirable feature, the value of which will be apparent to those familiar with the art. This knife may not only be employed for sampling bales of cotton, but may be otherwise employed.

Having thus described the invention what is claimed is:—

A knife including a handle and a blade having a flat tang entering the handle, one edge of the blade being sharpened and the other edge being thickened and offset outwardly from the respective edge of the tang, the outer end of the thickened edge merging into a hook and the shoulder provided at the inner end of the thickened edge merging into an outwardly curved projection forming a finger hold.

In testimony that I claim the foregoing as my own, I have hereto affixed my signature in the presence of two witnesses.

JACOB R. BOWERS.

Witnesses:
G. C. E. VAUGHAN,
S. H. VAUGHAN.